(12) United States Patent
Lentz et al.

(10) Patent No.: US 11,227,430 B2
(45) Date of Patent: Jan. 18, 2022

(54) OPTIMIZED PIXEL SHADER ATTRIBUTE MANAGEMENT

(71) Applicant: Samsung Electronics Co., Ltd., Suwon-si (KR)

(72) Inventors: Derek Lentz, Reno, NV (US); Chris Goodman, Round Rock, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/597,840

(22) Filed: Oct. 9, 2019

(65) Prior Publication Data

US 2020/0402295 A1    Dec. 24, 2020

Related U.S. Application Data

(60) Provisional application No. 62/863,851, filed on Jun. 19, 2019.

(51) Int. Cl.
*G06T 15/40* (2011.01)
*G06T 15/00* (2011.01)

(52) U.S. Cl.
CPC ............ *G06T 15/40* (2013.01); *G06T 15/005* (2013.01)

(58) Field of Classification Search
CPC ..... G06T 15/005; G06T 15/40; G06T 15/405; G06T 15/80
See application file for complete search history.

(56) References Cited

U.S. PATENT DOCUMENTS

| 7,400,325 | B1 | 7/2008 | Gimby et al. | |
| 8,542,247 | B1 | 9/2013 | Hakura et al. | |
| 2003/0067468 | A1* | 4/2003 | Duluk, Jr. | G06T 15/80 345/506 |
| 2014/0267224 | A1 | 9/2014 | Lum et al. | |
| 2014/0354654 | A1* | 12/2014 | Heggelund | G06T 15/40 345/501 |
| 2016/0086299 | A1 | 3/2016 | Sharma et al. | |
| 2016/0116973 | A1 | 4/2016 | Lee et al. | |
| 2016/0117855 | A1 | 4/2016 | Lee et al. | |
| 2017/0091989 | A1* | 3/2017 | Ramadoss | G06F 9/48 |
| 2017/0337656 | A1* | 11/2017 | Vembu | G06T 15/40 |
| 2017/0372509 | A1* | 12/2017 | Paltashev | G06T 15/005 |
| 2018/0082399 | A1 | 3/2018 | Martin et al. | |
| 2018/0286112 | A1* | 10/2018 | Lauritzen | G06T 17/20 |
| 2018/0308277 | A1* | 10/2018 | Surti | G06T 15/005 |

* cited by examiner

*Primary Examiner* — Daniel F Hajnik
(74) *Attorney, Agent, or Firm* — Renaissance IP Law Group LLP

(57) ABSTRACT

According to one general aspect, an apparatus may include a graphical processing engine comprising a pipeline having a plurality of substantially sequential circuit stages, the pipeline comprising a front-end output logic circuit configured to substantially separate position information into a position information pipeline portion, and non-position information in a non-position information pipeline portion. Wherein the pipeline is configured to perform a multi-stage culling of data.

20 Claims, 3 Drawing Sheets

OPTIMIZED PIXEL SHADER ATTRIBUTE MANAGEMENT

CROSS-REFERENCE TO RELATED APPLICATION

This application claims priority under 35 U.S.C. § 119 to Provisional Patent Application Ser. No. 62/863,851, entitled "OPTIMIZED PIXEL SHADER ATTRIBUTE MANAGEMENT" filed on Jun. 19, 2019. The subject matter of this earlier filed application is hereby incorporated by reference.

TECHNICAL FIELD

This description relates to computer architecture or more specifically, to an apparatus and method for optimized pixel shader attribute management.

BACKGROUND

A graphics processing unit (GPU) is often a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing. Their highly parallel structure makes them more efficient than general-purpose central processing units (CPUs) for algorithms that process large blocks of data in parallel. In a personal computer, a GPU can be present on a video card or embedded on the motherboard. In certain processors, they are embedded on the same die.

GPUs may be used to accelerate the memory-intensive work of texture mapping and rendering polygons, or to accelerate geometric calculations such as the rotation and translation of vertices into different coordinate systems. Developments in GPUs include support for programmable shaders which can manipulate vertices and textures with many of the same operations supported by CPUs, oversampling and interpolation techniques to reduce aliasing, and very high-precision color spaces.

In computer graphics, a computer graphics pipeline, rendering pipeline or simply graphics pipeline, is a conceptual model that describes what steps a graphics system needs to perform to render a three-dimensional (3D) scene to a two-dimensional (2D) screen. Once a 3D model has been created, for instance in a video game or any other 3D computer animation, the graphics pipeline is the process of turning that 3D model into what the computer displays.

SUMMARY

According to one general aspect, an apparatus may include a graphical processing engine comprising a pipeline having a plurality of substantially sequential circuit stages, the pipeline comprising a front-end output logic circuit configured to substantially separate position information into a position information pipeline portion, and non-position information into a non-position information pipeline portion. Wherein the pipeline is configured to perform a multi-stage culling of data.

According to another general aspect, a system may include a processor core configured to process instructions. The system may include a graphics core configured to render graphical data, wherein the graphics core comprises a graphics processing pipeline comprising a plurality of circuit stages, substantially sequentially arranged to at least partially process data as the data flows through the graphics processing pipeline. The circuit stages may include a front-end output logic circuit configured to provide un-culled data to one or more subsequent circuit stages. The circuit stages may include a multi-stage culling portion of the circuit stages configured to indicate to the front-end output logic circuit which data is culled data.

According to another general aspect, a method may include receiving graphical data from one or more front-end output buffers. The method may include determining, via a multi-stage culling that involves a plurality of graphical pipeline circuit stages, which graphical data may be removed, wherein determining includes converting a triangle into a triangle fan. The method may include preventing subsequent graphical pipeline circuit stages from accessing that culled data.

The details of one or more implementations are set forth in the accompanying drawings and the description below. Other features will be apparent from the description and drawings, and from the claims.

A system and/or method for computer architecture or more specifically, to an apparatus and method for optimized pixel shader attribute management, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
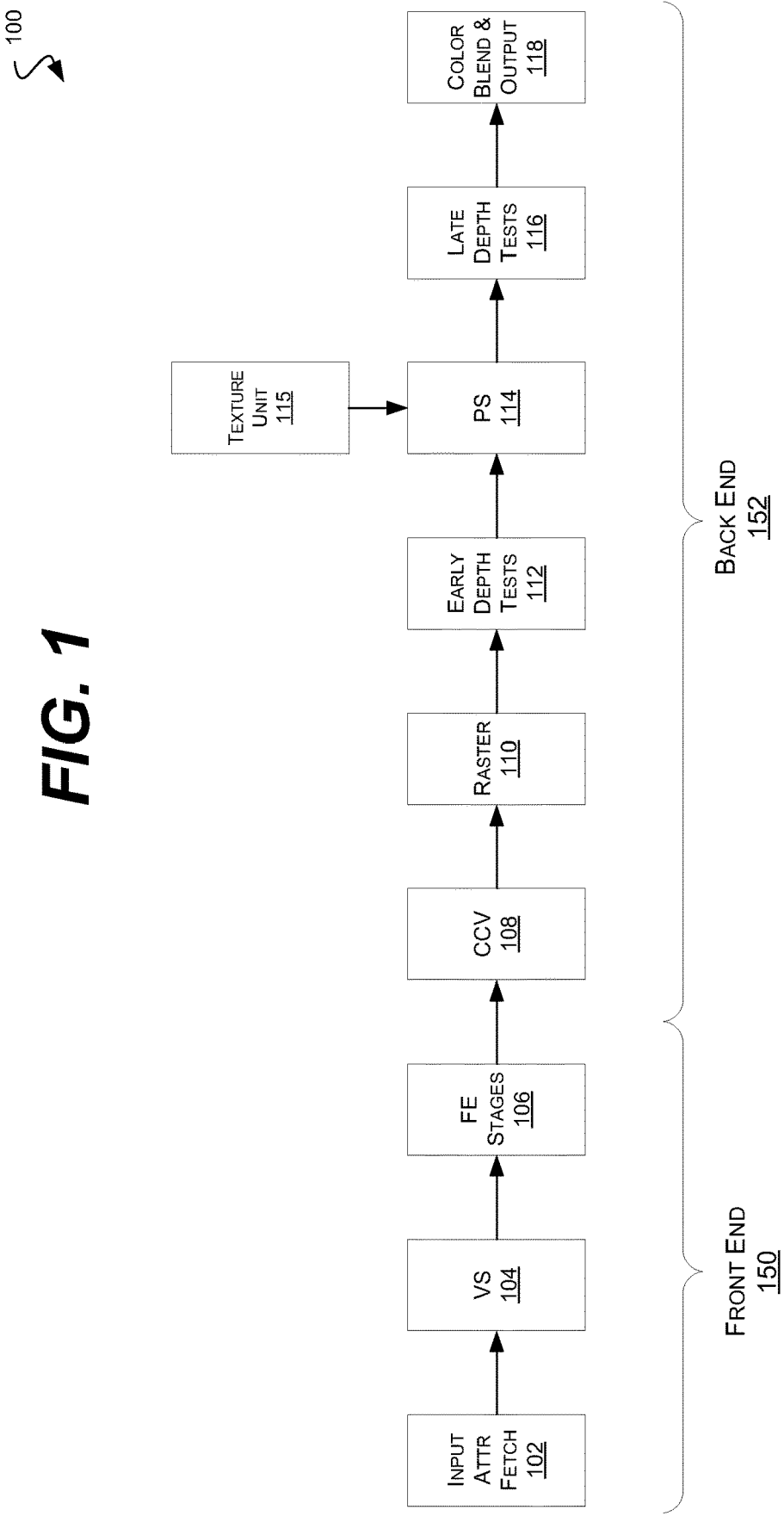
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may be part of a graphics processing unit (GPU), either individually or integrated into a chipset or processor (e.g., a system on a chip (SoC)). In various embodiments, the system 100 may include a graphics processing pipeline. The high-level pipeline 100 is shown, in part, to provide context to more detailed part of the pipeline shown in FIG. 2.

In the illustrated embodiment, the system 100 may include a number of stages or separate circuits in which data is processed and then traditionally passed from pipe stage to pipe stage. Traditionally, this passing of data has resulted in increased power usage (and with that excess heat), and wasted computing resources. In the illustrated embodiment, and described more in reference to FIG. 2, the system 100 may cull or remove data as it is determined to no longer be needed. Thus, the illustrated embodiment, may result in lower power usage, heat, and less wasted computing resources.

In the illustrated embodiment, a graphics pipeline 100 generally processes data that include a vertex (plural: vertices) that is a point in the three-dimensional world. Many points or vertices are used to join the surfaces of objects in the world. The vertices often form primitives, or basic shapes. A triangle is the most common geometric primitive used in computer graphics. It is defined by its three vertices and a normal vector. In various embodiments, one or three normal vectors are sometimes used. They are usually derived from the vertex position and order. The front face, for example, is defined by the vertex order and relative positions. A signed triangle area is computed, typically, and the sign specifies front or back facing. The normal vector serves to indicate the front face of the triangle and is a vector that is perpendicular to the surface. The triangle vertices may be provided with a number of attributes. For example, attributes, such as color or texture location (a texture is an image "glued" on top of triangle). Attributes may be thought of as including data specifying a position (positional; e.g., x/y coordinates) or about something other than a position (non-positional' e.g., a color, brightness, etc.)

In the illustrated embodiment, the system 100 may include an input attribute fetch unit or circuit 102. In such an embodiment, the input attribute fetch circuit 102 may be configured to receive vertex attribute data (e.g., in arrays).

In the illustrated embodiment, the system 100 may include one or more shaders units or circuits 104, such as, for example, a vertex shaders (VS) or pixel shaders (PS). In various embodiments, the vertex shader may be configured to transform each vertex's 3D position in some modelling or object 3D space to a 2D coordinate at which it appears on the screen and a depth value for the Z-buffer to a 3D space called "clip space" where clipping can be performed on the primitives formed by these vertices. Clipping removes invisible primitives and subdivides primitives that are partially visible.

In the illustrated embodiment, the system 100 may include one or more front-end (FE) stages or circuits 106, such as for example, optional stages or required front-end stages such as primitive assembly (PA). In various embodiments, these FE stages 106 may include zero or more optional processing units or circuits (not individually shown) that may be added or removed from the pipeline based upon the processing task desired. Example FE stages 106 may include a Tessellation shader, a geometry shader, hull shader, domain shader, unified shader, etc. It is understood that the above are merely a few illustrative examples to which the disclosed subject matter is not limited.

In the illustrated embodiment, the input attribute fetch circuit 102, the vertex shader 104, and any front-end stages 106 may be conceptually grouped into the front-end pipeline portion 150 of the system 100. These front-end units or circuits may be configured to pre-process or prepare the vertex data for final processing and rendering. This may include forming the vertices into primitives and then passing the vertex position and attributes to the back-end 152 for pixel shader use.

In the illustrated embodiment, the stages 108, 110, 112, 114, 115, 116, and 118 may be considered part of the back-end pipeline portion 152. In such an embodiment, the back-end 152 may be configured to perform the final graphical processing before the image is displayed on a screen or display (not shown).

In the illustrated embodiment, the system 100 may include a clipping, culling, and viewport operations (CCV) unit or circuit 108. In various embodiments, the CCV unit 108 may be configured to determine which primitives need to be altered or clipped, and any changes that need to be made for the virtual viewport or camera, and then cull the data as needed. In a traditional system, the CCV unit 108 may be the only or primary culling operation in the system. However, as described below in reference to FIG. 2, the illustrated system 100 may employ a multi-stage culling operation.

In the illustrated embodiment, the system 100 may include a rasterization engine, unit, or circuit 110. In such an embodiment, the rasterization circuit 110 may be configured to use primitive outlines to compute which pixels are covered by the primitives.

In the illustrated embodiment, the system 100 may include an early depth test unit or circuit 112. The early depth test unit or circuit 112 may be configured to interpolate attributes to pixel or sample locations for use by the pixel shaders. In various embodiments, this may be done in dedicated interpolation hardware, by the pixel shaders or by some combination of these.

In the illustrated embodiment, the system 100 may include one or more pixel shaders (PS) units or circuits 114. In various embodiments, the PS units 114 may be configured to compute pixel colors and other pixel data which is often derived using texture image data. In various embodiments, the texture image data may be supplied by the texture unit or circuit 115.

In the illustrated embodiment, the system 100 may include late stage depth test units or circuits 116. In such an embodiment, the late stage depth test units or circuits 116 may be configured to perform pixel depth testing and updates the depth and stencil buffers. In various embodiments, additional culling may be performed by the depth units 112 and 116.

In the illustrated embodiment, the system 100 may also include a color blend and output unit or circuit 118. The color blending and output unit 118 may be configured to perform pixel blending computations and write final pixel colors to the color buffers (not shown). The pixels may then be displayed upon a screen (not shown).

Figure 2:
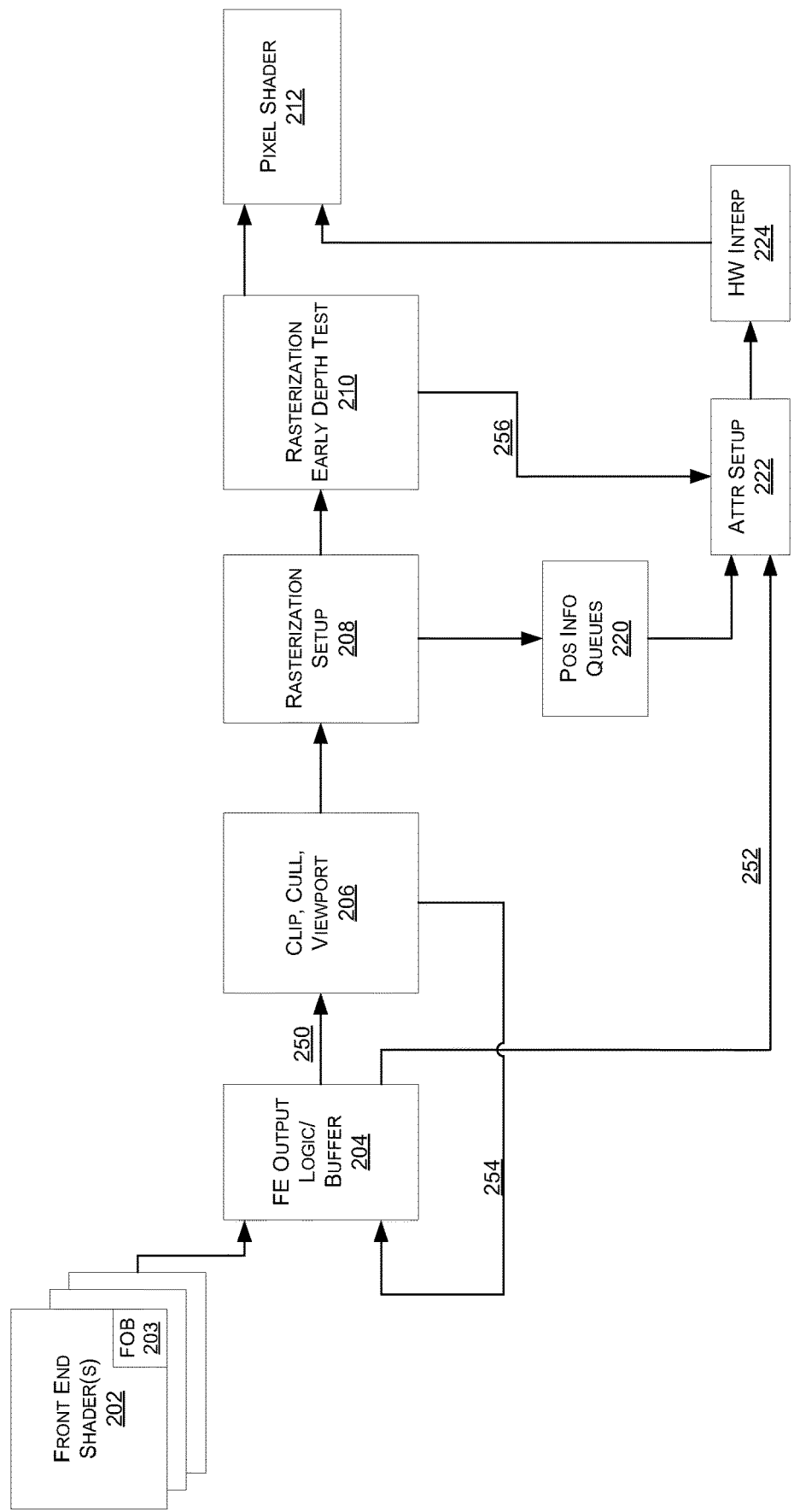
FIG. 2 is a block diagram of an example embodiment of a system in accordance with the disclosed subject matter.

FIG. 2 is a block diagram of an example embodiment of a system or pipeline 200 in accordance with the disclosed subject matter. In the illustrated embodiment, more detailed version of a sub-set of the graphics pipeline shown in FIG. 1 is shown.

In the illustrated embodiment, the pipeline 200 may include a number of front-end (FE) shader units or circuits 202. These FE shaders 202 may compute pixel shader attributes and other data. Each shader 202 may include a front-end output buffer (FOB) 203. In another embodiment, the FOB 203 may be separate and be filled by whatever shader 202 is the last in that image's processing. In another embodiment, the FOB 203 may be included as part of the front-end output logic (FOL) unit or circuit 204, described below. The FOB 203 may be configured to store the shader attributes.

In the illustrated embodiment, the system 200 may include a FE output logic (FOL) unit or circuit 204. In various embodiments, the FOL may read vertex data (including the attributes) and pass that data to later pipeline stages. In the illustrated embodiment, the FOL 204 may help cull or remove unneeded or unwanted data such that the various pipeline stages do not have to process it, or the system 200 may not be required to move the data. Again, the processing and movement data involves higher power usage and heat generation, a reducing in both is desired.

In the illustrated embodiment, the FOL 204 may be configured to split the data path into two portions, a positional path (stages 206, 208, and 210) and a non-positional path (stages 222 and 224). Attributes 250 that include positional information may be processed and used to make culling determinations, as described below. Attributes 252 that include non-positional information may be held (as described below) until the positional culling determination has been made, and then respectively culled. In such an embodiment, the FOL 204 may facilitate a multi-stage culling process that removes unneeded information before it is processed by the later stages.

In such an embodiment, the FOL 204 may be configured to read vertex position information and primitive connectivity from the FOB(s) 203 and form primitives. The FOL 204 may be configured to send position information from these vertices and related connectivity to the CCV stage 206. In return, the FOL 204 may receive information from the CCV stage 206 as to which primitives survive or do not survive CCV primitive and vertex culling. The FOL 204 may be configured to, after culling, read surviving non-position vertex attributes from the FOB 203 and pass those required by primitives to later stages (e.g., stages 222 and 224, etc.).

The system 200 may include a clip, cull, viewport (CCV) unit or circuit 206. The CCV unit 206 may be configured to perform primitive clipping and vertex culling. It may also eliminate small primitives that cannot render any pixels or samples. It may also perform the viewport transform operation.

In such an embodiment, the CCV unit 206 may be configured to inform the FOL unit 204 which vertices or primitives whose vertices need to pass down the pipeline 200 and which primitives or vertices to discard, as described above and shown by signal 254.

In one embodiment, the CCV unit 206 may also perform clipping. In various embodiments, the CCV unit 206 may be configured to perform primitive clipping but not attribute computations. All primitives generated by clipping a single input primitive may be referred to as "sub-primitives". For example, a triangle that is clipped may be converted into a triangle fan, since triangle clipping generally produces multiple output triangles. These sub-primitives may only need to be unique during rasterization. In such an embodiment, the CCV unit 206 may be configured to compute a set of Barycentric factors for all clipped primitives. In various embodiments, these Barycentric factors may be used by the attribute setup unit 222 to compute clipped vertex attribute values. All sub-primitives of an input primitive may use the same attribute setup output (e.g., the same plane equations or Barycentric setup).

In the illustrated embodiment, the system 200 may include a rasterization setup unit or circuit 208. In such an embodiment, the rasterization setup unit 208 may be configured to compute setup information for the rasterization and depth testing stages 210.

In such an embodiment, the rasterization setup unit 208 may be configured to determine which information is useful to attribute setup and which information is required for control purposes, or neither. In one embodiment, this information may be stored in a buffer until needed. Primitives may be tested to see if any coverage survives culling such as from a scissor region, tile region, etc. Primitives (and their attributes) that do not survive all the tests may be culled at this stage.

In the illustrated embodiment, the system 200 may include a rasterization and early depth testing unit or circuit 210. As described above, in various embodiments, these may be multiple units or circuits. In the illustrated embodiment, the rasterization unit 210 may be configured to generate pixel or sample coverage information for each primitive. And, the early depth testing portion of unit 210 may be configured to perform depth tests before the pixel shaders 212 are executed. In such an embodiment, primitives with no coverage or not visible on the screen after the rasterization, early depth and/or stencil testing may be culled.

In various embodiments, additional units or circuits (not shown) may be part of the system 200. In such an embodiment, additional culling may occur or be performed by those units. In various embodiments, these culling operations may include redundant coverage discard (RDC) and/or Quad-Merge. It is understood that the above are merely a few illustrative examples to which the disclosed subject matter is not limited.

In the illustrated embodiment, the system 200 may include an attribute setup unit or circuit 222. As described above, the attribute setup unit 222 may receive non-positional information 252 that is associated with the positional information 250. In such an embodiment, the attribute setup unit 222 may be configured to cull various non-positional information 252 based upon the information and culling activities of the positional portion of the pipeline (e.g., units 206, 208, and 210). In various embodiments and in the system 200 as a whole, attribute culling may be performed vertex-by-vertex. In such an embodiment, attributes from vertices that are no longer required because surviving primitives no longer require the vertices may be culled.

For example, a first culling may occur not by the attribute setup unit 222, but by the FOL 204 in response to the feedback 254 provided by the CCV 206. The FOL 204 may simply refrain from sending any culled attributes to the attribute setup unit 222. A second culling may occur when the positional information culling results are provided by the rasterization setup unit 208 (via the positional information queue 220). A third culling may occur when feedback is received from the rasterization unit 210 (via the signal 256). In another embodiment, the feedback 220 and 258 may be sent back to the FOL 204, such that the culled non-positional information are never transmitted to the attribute setup unit 222.

In such an embodiment, the non-positional attribute processing may be delayed until all culling information from the multi-stage culling portion (units 206, 208, and 210) has been received. If a particular vertex has no "live" coverage or has been culled, the non-positional information associated with it may likewise be culled or discarded. Therefore, the amount of information passed to the next stages 224 and 212 may be reduced, not just by the positional stages, but by the non-positional stages. Likewise, the splitting of the attributes into two pipelines means that less information travels or is transmitted through the two pipelines. In various embodiments, all attribute computations may be performed by the attribute setup unit 222, including applying Barycentric factors from clipping and perspective correction.

Further, attribute information required for interpolation, such as plane equations or Barycentric factors, may be saved for use in an attribute storage memory included by the attribute setup unit 222 (or as a separate memory, not shown).

In various embodiments, the system 200 may include a hardware interpolation unit or circuit 224. The interpolation unit 224 may be configured to interpolate data.

In various embodiments, the system 200 may include a pixel shader (PS) unit or circuit 212. The pixel shader unit 212 may be configured to receive the non-culled or surviving positional information and the non-culled or surviving non-positional information, and compute color and other attributes of each "fragment" or unit of rendering work affecting at most a single output pixel.

In the illustrated embodiment, the power usage is reduced by reducing the amount of data movement along the pipeline 200, reducing the computation (as less data is involved after each culling) and reducing the amount of storage (e.g., in buffers in between each pipeline stage). As to the data whenever a particular primitive is culled, its vertexes and associated attributes may no longer be needed and may be discarded. Aside from the computation savings along each culling stage, saving is also found in not performing attribute setup computations and interpolations for the culled attributes. It is understood that the above are merely a few illustrative examples to which the disclosed subject matter is not limited.

Figure 3:
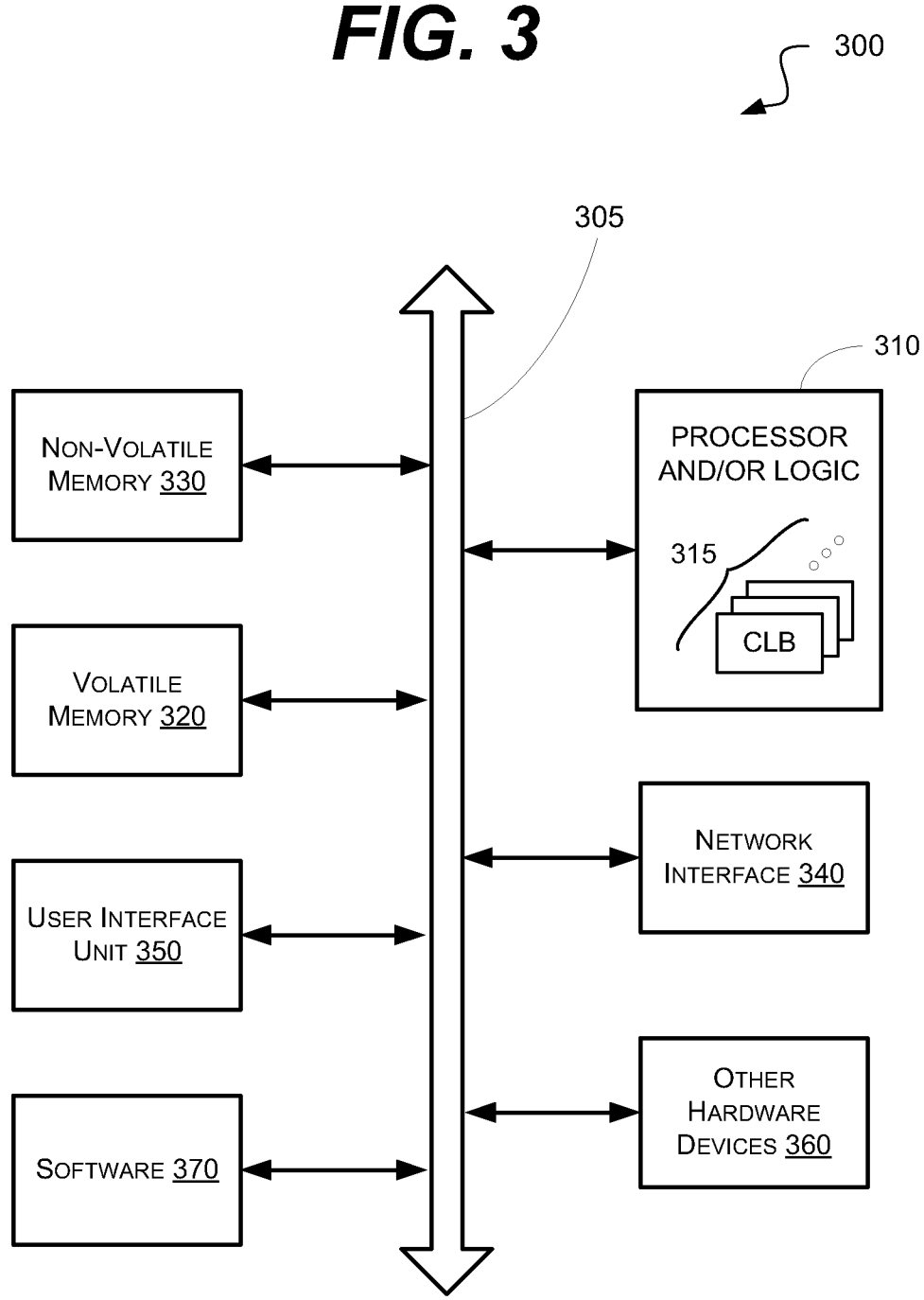
FIG. 3 is a schematic block diagram of an information processing system that may include devices formed according to principles of the disclosed subject matter.

FIG. 3 is a schematic block diagram of an information processing system 300, which may include semiconductor devices formed according to principles of the disclosed subject matter.

Referring to FIG. 3, an information processing system 300 may include one or more of devices constructed according to the principles of the disclosed subject matter. In another embodiment, the information processing system 300 may employ or execute one or more techniques according to the principles of the disclosed subject matter.

In various embodiments, the information processing system 300 may include a computing device, such as, for example, a laptop, desktop, workstation, server, blade server, personal digital assistant, smartphone, tablet, and other appropriate computers or a virtual machine or virtual computing device thereof. In various embodiments, the information processing system 300 may be used by a user (not shown).

The information processing system 300 according to the disclosed subject matter may further include a central processing unit (CPU), logic, or processor 310. In some embodiments, the processor 310 may include one or more functional unit blocks (FUBs) or combinational logic blocks (CLBs) 315. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 300 according to the disclosed subject matter may further include a volatile memory 320 (e.g., a Random Access Memory (RAM)). The information processing system 300 according to the disclosed subject matter may further include a non-volatile memory 330 (e.g., a hard drive, an optical memory, a NAND or Flash memory). In some embodiments, either the volatile memory 320, the non-volatile memory 330, or a combination or portions thereof may be referred to as a "storage medium". In various embodiments, the volatile memory 320 and/or the non-volatile memory 330 may be configured to store data in a semi-permanent or substantially permanent form.

In various embodiments, the information processing system 300 may include one or more network interfaces 340 configured to allow the information processing system 300 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 300 according to the disclosed subject matter may further include a user interface unit 350 (e.g., a display adapter, a haptic interface, a human interface device). In various embodiments, this user interface unit 350 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 300 may include one or more other devices or hardware components 360 (e.g., a display or monitor, a keyboard, a mouse, a camera, a fingerprint reader, a video processor). It is understood that the above are merely a few illustrative examples to which the disclosed subject matter is not limited.

The information processing system 300 according to the disclosed subject matter may further include one or more system buses 305. In such an embodiment, the system bus 305 may be configured to communicatively couple the processor 310, the volatile memory 320, the non-volatile memory 330, the network interface 340, the user interface unit 350, and one or more hardware components 360. Data processed by the processor 310 or data inputted from outside of the non-volatile memory 330 may be stored in either the non-volatile memory 330 or the volatile memory 320.

In various embodiments, the information processing system 300 may include or execute one or more software components 370. In some embodiments, the software components 370 may include an operating system (OS) and/or an application. In some embodiments, the OS may be configured to provide one or more services to an application and manage or act as an intermediary between the application and the various hardware components (e.g., the processor 310, a network interface 340) of the information processing system 300. In such an embodiment, the information processing system 300 may include one or more native applications, which may be installed locally (e.g., within the non-volatile memory 330) and configured to be executed directly by the processor 310 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 310.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a graphical processing engine comprising a pipeline having a plurality of substantially sequential circuit stages, the pipeline comprising:
a front-end output logic circuit configured to receive attribute data of graphical data, the attribute data comprising position data and non-position data, the front-end output logic circuit further configured to output the position data into a position data path of the pipeline and output the non-position data into a non-position data path of the pipeline,
wherein the position data path of the pipeline is configured to:
perform a multi-stage culling of positional data, and
cause non-positional data corresponding to culled positional data to be removed from the non-position data path of the pipeline based on feeding back culling information to the front-end output logic circuit for removal of non-positional data.

2. The apparatus of claim 1, wherein the front-end output logic circuit is configured to:
cull non-positional data corresponding to culled positional data, preventing the non-positional data corresponding to the culled positional data from being received by a subsequent pipeline circuit stage.

3. The apparatus of claim 1, wherein the pipeline comprises a culling circuit configured to:
cull primitive data based, at least in part, upon primitive characteristics; and
prevent non-positional data corresponding to culled primitive data from being processed by a subsequent pipeline circuit stage.

4. The apparatus of claim 1, wherein the pipeline comprises a rasterization circuit configured to:
cull primitive data based, at least in part, upon visibility determination; and
prevent non-positional data corresponding to culled visibility data from being processed by a subsequent pipeline circuit stage.

5. The apparatus of claim 1, wherein the pipeline comprises a culling circuit and a rasterization circuit, wherein the front-end output logic circuit, the culling circuit, and the front-end output logic circuit are placed substantially in series, and each performs a culling operation to reduce an amount of data passed to a next pipeline stage, wherein at least the front-end output logic circuit, the culling circuit, and the front-end output logic circuit form a multi-stage culling portion of the pipeline.

6. The apparatus of claim 1, wherein the pipeline comprises an attribute setup circuit and a culling circuit; and
wherein the non-position data is routed from the front-end output logic circuit to the attribute setup circuit, and
wherein the position data is routed from the front-end output logic circuit to the culling circuit.

7. The apparatus of claim 6, wherein the attribute setup circuit is configured to delay primitive attribute interpolation setup until after primitive data has been culled.

8. The apparatus of claim 1, wherein the pipeline is configured to perform the multi-stage culling of data by culling attribute data before culling primitive data.

9. The apparatus of claim 1, wherein the pipeline comprises a culling circuit and at least one subsequent processing circuit stage, architecturally after the culling circuit;
wherein the front-end output logic circuit is configured to:
receive an indication from the culling circuit regarding which data to cull,
read surviving data from a front-end output buffer, and
as needed, pass surviving data, or a portion thereof, to the at least one subsequent processing circuit stage for processing.

10. A system comprising:
a processor core configured to process instructions; and
a graphics core configured to render graphical data, wherein the graphics core comprises a graphics processing pipeline comprising a plurality of circuit stages substantially sequentially arranged to at least partially process the graphical data as the graphical data flows through the graphics processing pipeline, the graphical data comprising positional data and non-positional data,
wherein the circuit stages include:
a front-end output logic circuit configured to receive the graphical data and to provide un-culled graphical data to one or more subsequent circuit stages, and remove culled graphical data from the graphics processing pipeline; and
a multi-stage culling portion of a positional information portion of the circuit stages that is subsequent to the front-end output logic and is configured to feedback to the front-end output logic circuit which non-positional data to cull from the graphical data received by the front-end output logic circuit.

11. The system of claim 10, wherein the front-end output logic circuit is configured to:
determine unneeded positional data that is not needed by a subsequent pipeline circuit stage; and
cull graphical data corresponding to the unneeded positional data, preventing the graphical data corresponding to the unneeded positional data from being processed by the subsequent pipeline circuit stage.

12. The system of claim 10, wherein the pipeline comprises a culling circuit configured to:
cull primitive data based, at least in part, upon primitive characteristics; and prevent graphical data corresponding to the culled primitive data from being processed by a subsequent pipeline circuit stage.

13. The system of claim 10, wherein the pipeline comprises a rasterization circuit configured to:
  cull primitive data based, at least in part, upon visibility determination; and
  prevent graphical data corresponding to the culled primitive data from being processed by a subsequent pipeline circuit stage.

14. The system of claim 10, wherein the multi-stage culling portion comprises a culling circuit and a rasterization circuit, and
  wherein the front-end output logic circuit, the culling circuit, and the front-end output logic circuit are placed substantially in series, and each circuit performs a culling operation to reduce an amount of data passed to a next pipeline stage.

15. The system of claim 10, wherein the pipeline comprises an attribute setup circuit and a culling circuit; and
  wherein non-position information is routed from the front-end output logic circuit to the attribute setup circuit, and
  wherein position information is routed from the front-end output logic circuit to the culling circuit.

16. The system of claim 15, wherein the attribute setup circuit is configured to delay primitive attribute interpolation setup until after primitive data has been culled.

17. The system of claim 10, wherein the pipeline is configured to perform a multi-stage culling of data by culling attribute data before culling primitive data.

18. The system of claim 10, wherein the pipeline comprises a culling circuit and at least one subsequent processing circuit stage, architecturally after the culling circuit;
  wherein the front-end output logic circuit is configured to:
    receive an indication from the culling circuit regarding which graphical data to cull,
    read un-culled graphical data from a front-end output buffer, and
    as needed, pass the un-culled graphical data, or a portion thereof, to the at least one subsequent processing circuit stage for processing.

19. A method, comprising:
  receiving, at a front-end output logic circuit of a graphical pipeline, graphical data from one or more front-end output buffers, the graphical data comprising positional data and non-positional data;
  determining at a culling circuit that is subsequent to the front-end output logic circuit in the graphical pipeline which graphical data may be removed based on positional data;
  removing positional data determined to be removed by the culling circuit; and
  feeding back information from the culling circuit to the front-end output logic circuit to remove non-positional data corresponding to the positional data determined to be removed.

20. The method of claim 19, wherein determining comprises:
  determining, by the front-end output logic circuit, unneeded attribute data that is not needed by a subsequent pipeline circuit stage based on the information received from the culling circuit;
  culling, by the culling circuit, primitive data based, at least in part, upon primitive characteristics; and
  culling, by a rasterization circuit, primitive data based, at least in part, upon visibility determination.

* * * * *